United States Patent
Ollier et al.

(10) Patent No.: US 6,439,437 B1
(45) Date of Patent: Aug. 27, 2002

(54) PREPARATION OF MIXTURES FOR THE PRODUCTION OF AERATED BEVERAGES

(76) Inventors: Georges Ollier, 32, boulevard Jacques Tête, 95300 Pontoise (FR); Jean-Pierre Kuntz, 20, rue de la Gare, 67720 Weyersheim (FR)

( * ) Notice: Subject to any disclaimer, the term of this patent is extended or adjusted under 35 U.S.C. 154(b) by 0 days.

(21) Appl. No.: 09/581,315

(22) PCT Filed: Dec. 7, 1998

(86) PCT No.: PCT/FR98/02647

§ 371 (c)(1), (2), (4) Date: Jun. 12, 2000

(87) PCT Pub. No.: WO99/29404

PCT Pub. Date: Jun. 17, 1999

(30) Foreign Application Priority Data

Dec. 11, 1997 (FR) .............................. 97 15714

(51) Int. Cl.[7] .............................................. B65D 88/54
(52) U.S. Cl. ...................... 222/318; 141/134; 141/129; 141/131; 141/82
(58) Field of Search ...................... 222/318; 137/565.35, 137/563; 141/134, 129, 131, 82

(56) References Cited

U.S. PATENT DOCUMENTS

| | | | | |
|---|---|---|---|---|
| 2,018,119 A | * | 10/1935 | Brouse | 137/115.01 |
| 2,894,664 A | * | 7/1959 | Mroz | 137/563 |
| 2,972,546 A | * | 2/1961 | Adler et al. | 106/170.16 |
| 3,195,589 A | * | 7/1965 | Houda, Jr. | 141/131 |
| 3,235,129 A | * | 2/1966 | Kruckeberg | 222/135 |
| 3,519,015 A | * | 7/1970 | Bartel | 137/563 |
| 4,140,245 A | * | 2/1979 | Castillo | 222/318 |
| 4,416,194 A | * | 11/1983 | Kemp | 141/82 |
| 4,430,054 A | * | 2/1984 | Furuya | 137/563 |
| 4,653,532 A | * | 3/1987 | Powers | 137/563 |
| 4,742,939 A | * | 5/1988 | Galockin | 137/101.27 |
| 4,793,515 A | * | 12/1988 | Shannon et al. | 222/130 |
| 5,062,548 A | * | 11/1991 | Hedderick et al. | 137/170.1 |
| 5,275,212 A | * | 1/1994 | Moris | 141/11 |
| 5,665,228 A | * | 9/1997 | Leaverton et al. | 210/169 |
| 5,738,248 A | * | 4/1998 | Green | |
| 5,823,388 A | * | 10/1998 | Green | 222/1 |
| 6,220,296 B1 | * | 4/2001 | Ragsdale et al. | 137/563 |
| 6,317,903 B1 | * | 11/2001 | Brunelle et al. | 4/541.1 |

FOREIGN PATENT DOCUMENTS

GB 2091911 A * 8/1982

* cited by examiner

Primary Examiner—Timothy L. Maust
Assistant Examiner—Khoa D. Huynh
(74) Attorney, Agent, or Firm—Connolly Bove Lodge & Hutz LLP

(57) ABSTRACT

Apparatus for the preparation of homogeneous mixtures from liquid components which may have different viscosities, which comprises a dynamic saturation/blending loop (14), having a small volume, in the feed line (12) feeding a bottle-filling machine, between a feeding pump (10) of the latter and the bottle-filling machine, in which loop the saturation/blending mixture, having a reduced volume, circulates continuously. The apparatus comprises a pump (20), said pump ensuring a minimum flow rate which is higher than the flow rate of the bottle-filling machine, and ensuring the circulation of the mixture in said dynamic loop (14), a storing loop (9), and a separator (27), which ensures the delivery of the homogeneous mixture toward the feed line (12) for feeding the bottle-filling machine.

8 Claims, 2 Drawing Sheets

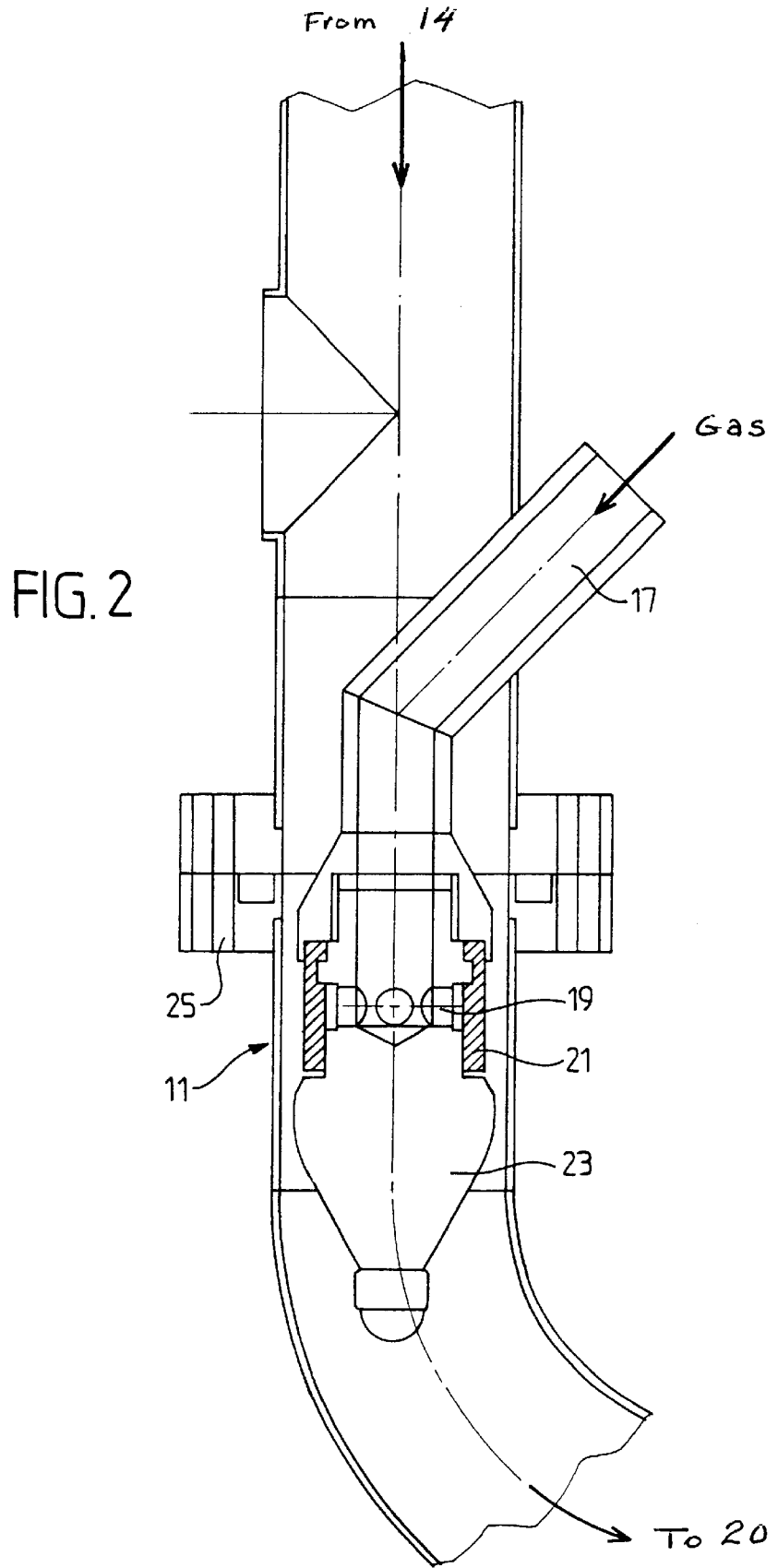

PREPARATION OF MIXTURES FOR THE PRODUCTION OF AERATED BEVERAGES

FIELD OF THE INVENTION

The present invention relates to the preparation of homogeneous mixtures from liquid components, in particular foodstuffs, and it relates, more particularly, to the production of beverages, in particular aerated beverages, in an in-line arrangement, i.e. the apparatus for the preparation according to the invention directly feeds the packaging plant, in particular the bottling plant, or the like.

BACKGROUND OF THE INVENTION

It is known that, in order to ensure an effective mixing of product components which may have different viscosities, it is necessary to carry out forceful churning of the mixture, and this is generally provided by turbulences. In instances of varying speeds and stoppages of the inflow of the mixture, said churning abates, which results in undesirable variations in the proportions or composition and homogeneity of the end product.

In order to overcome this difficulty, present practice involves the use of buffer flasks, of a larger or smaller volume and arranged between the production apparatus and the packaging system (bottle-filling machine), in order to prevent excessive stoppages and in order to counteract variations in input or homogeneity resulting from alternating stoppage and re-starting phases. Such known equipment involves storage problems associated with the control of the buffer stock of the product and also with the cleaning procedure when the products are to be changed.

BRIEF DESCRIPTION OF THE INVENTION

On the basis of this state of the art, which is not entirely satisfactory, the applicants intend to provide an apparatus for the production of beverages, in particular aerated beverages, which will meet the following objects:

the production of the beverage must be carried out in-line from different components, taking up minimal space, prior to feeding the bottle-filling machine;

it must be possible to include means for dissolving a gas ($CO_2$) in the liquid, for saturation, in order to produce aerated beverages;

the apparatus must permit direct feeding of a racking device which operates at variable flow rates involving stoppage and re-starting phases, the racking device being provided with rate controllers which ensure sequential re-starts;

it must be possible to obtain a constant percentage saturation, whatever the variations in the flow-rate;

it must provide maximum reliability in respect of the proportions of the different components or constituents and in respect of their blending into a homogeneous product, in which the proportions of the various constituents must not change during stoppages and restarts;

the quantity of finished product in the apparatus must be kept to a minimum, and in-line cleaning of the apparatus must be possible, readily carried out and ensure the highest degree of hygiene.

These objects are met by a production apparatus wherein a dynamic saturation/blending loop, having a small volume, is incorporated, in a feed line feeding a bottle-filling machine, between a feeding pump of the latter, and the bottle-filling machine, in which loop the mixture circulates continuously and which comprises:

a pump, which upstream receives inflowing constituents (driving and driven products) prior to being mixed, said pump ensuring a minimum flow rate which is higher than a flow rate of the bottle-filling machine, and ensuring the circulation of the mixture in said dynamic loop, a storing loop, the capacity of which is adapted to the flow rate and to the prepared product, and a separator, which ensures the delivery of a homogeneous mixture for feeding the bottle-filling machine.

In particular, according to a first aspect of the invention, there is provided apparatus for the preparation of homogeneous mixtures from liquid components which may have different viscosities, in particular with a view to the production of beverages, wherein a dynamic saturation/blending loop, having a small volume, is incorporated in a feed line feeding a bottle-filling machine, between a feeding pump of the latter, and the bottle-filling machine, in which loop a saturation/blending mixture, having a reduced volume, circulates continuously and which comprises:

a pump which upstream receives inflowing constituents (driving and driven products) prior to being mixed, said pump ensuring a minimum flow rate which is higher than a flow rate of the bottle-filling machine, and ensuring the circulation of the mixture in said dynamic loop, a storing loop, the capacity of which is adapted to the flow rate and to the prepared product, and a separator, which ensures the delivery of a homogeneous mixture toward the feed line for feeding the bottle-filling machine.

According to a feature of the present invention, which is applicable for mixtures of highly viscous liquid products, a mixer is provided and is arranged upstream of the pump of the loop and receives the constituents to be mixed.

The invention permits the production of aerated beverages and, in that case, the apparatus comprises means for introducing and dissolving gas, in particular $CO_2$, in said homogeneous mixture of constituents, which means are incorporated between the inlet into the loop and the pump of the loop, or immediately upstream of said pump, and are designed to be a saturator having a non-return valve, incorporated in the liquid flow stream in order to prevent any liquid from flowing back into a supply pipe for the gas, and a static mixer, provided on said dynamic loop, for ensuring the dispersion of the gas in the homogeneous liquid mixture.

According to a preferred embodiment of said saturator, it comprises a body in which is disposed an upstream venturi tube having an axial pipe for the injection of gas, which pipe communicates with a diffusion neck which is provided with radial nozzles and is fitted with a non-return ring of an elastic material, in particular an elastomer material.

In addition, it is possible for the apparatus according to the invention to comprise:

control valves in respect of pressure losses at the outlet of the dynamic loop, in order to adjust the pressure in the saturator and in the direction of the bottle-filling machine;

one or more means for in-line metering, disposed at an outlet from said dynamic loop or in said loop before said saturator;

wide-range modulating valves for the flow rate in the system feeding the products (driven products) prior to being mixed with the driving product (generally water);

precision flow meters in the systems feeding the driving and the driven products, and pressure-reducing valves in lines feeding the driven product, which ensure a constant pressure downstream of said modulating valves.

The invention also provides an automated process for the above-mentioned plant, which process may, in particular, comprise the following steps:

a proportional control, on the basis of a proportion-calculating algorithm, between a flow rate of finished product used by a bottle-filling machine and the respective flow rates of the driven products, the automatic control producing set percentages for the injection of driven products, as a factor depending on the finished product bottled;

correction of the proportion, depending on the final metering;

producing the parameters of the driven products, stored per product to be produced, in order to permit an automatic control of the plant depending on the product to be packaged;

control of the quantity of product to be prepared;

use of warning signals produced by the automatic control when variations in the finished product are detected, on the basis of predetermined high and low thresholds, accompanied by stoppage of the bottle-filling operation and automatic recycling, and stopping the circulation of liquids in a dynamic loop in the event of an interruption in the bottle-filling operation or in the event of a warning signal, with a pump of the dynamic loop stopping after a time delay, so as to prevent the temperature from rising in the dynamic loop.

In particular, according to a second aspect of the invention, there is provided a process for the automation of the apparatus according to any one of the preceding claims, which comprises the following steps:

a) a proportional control, on the basis of a proportion-calculating algorithm, between the flow rate of finished product, measured by a flow meter, used by the bottle-filling machine and the respective flow rates of the driven products, also measured by flow meters, the automatic control producing set percentages or set points for the injection of driven products, as a factor depending on the finished product bottled, the meterings obtained from the metering loop or loops (dissolved $CO_2$, etc.) being used as automatic-control/correction when the flow rate is stable, with the last correction measured prior to a variation in the flow rate being taken into consideration during phase s in which there is a variation in the flow rate;

b) producing the parameters of the driven products, stored per product to be produced, in order to permit an automatic control of the plant depending on the product to be packaged or bottled;

c) control of the quantity of product to be prepared;

d) use of warning signals produced by the automatic control when variations in the finished product are detected, on the basis of predetermined high and low thresholds, accompanied by stoppage of the bottle-filling operation and automatic recycling, and e) stopping the circulation of liquids in the dynamic loop in the event of an interruption in the bottle-filling operation or in the event of a warning signal, with the pump of the dynamic loop stopping after a time delay, so as to prevent the temperature from rising in the dynamic loop.

BRIEF DESCRIPTION OF THE FIGURES

Other features and advantages of the present invention are set out in the following description which makes reference to the attached drawings, in which:

FIG. 2 is a view of a longitudinal axial section of means provided according to the invention for introducing a gas into a mixture.

DETAILED DESCRIPTION OF THE INVENTION

Figure 1:
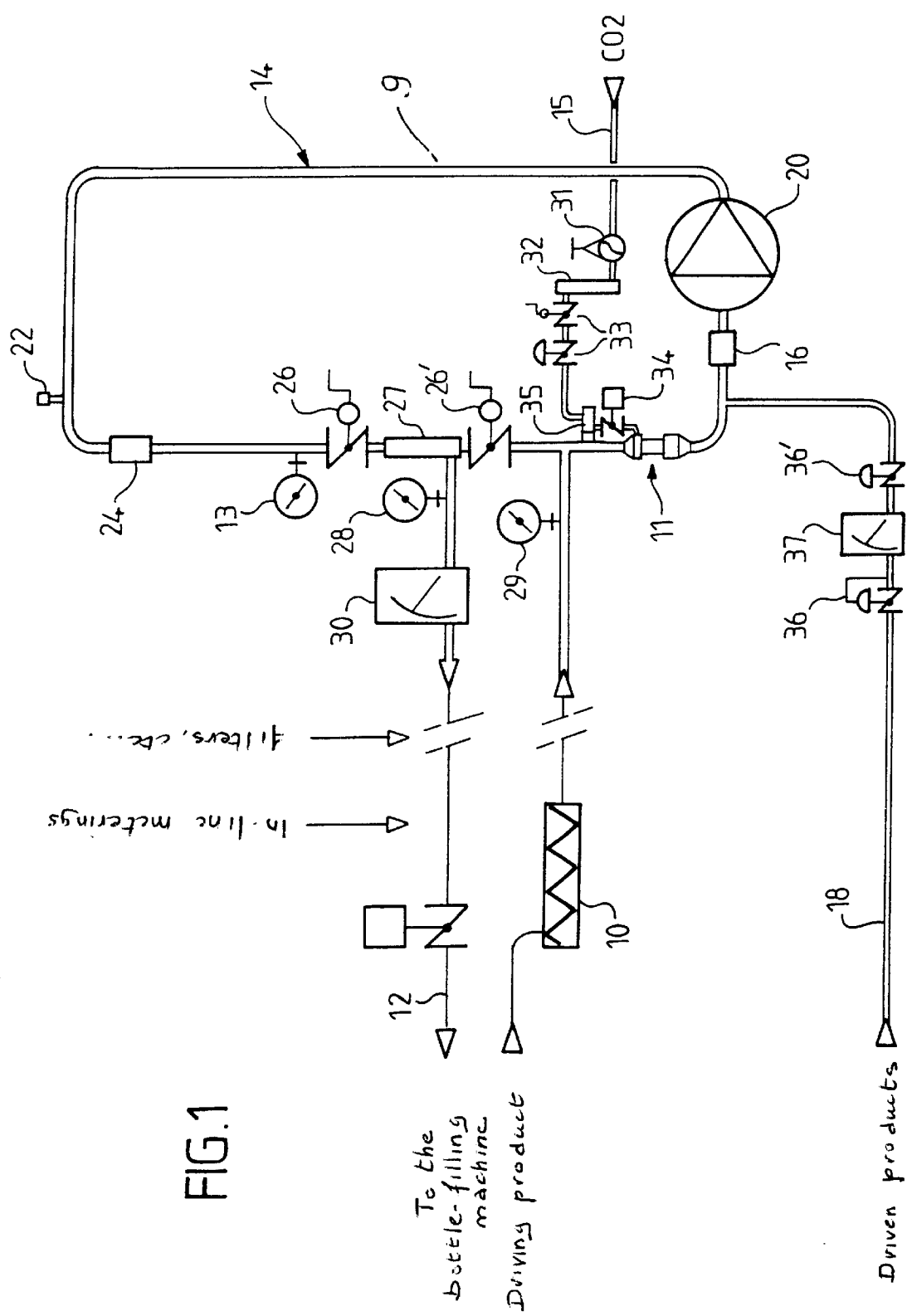
FIG. 1 is a diagrammatic view of apparatus according to the invention.

Referring to FIG. 1 of the drawings, it can be seen that a feedstock, or driving product (in particular water), of a mixture to be produced (in the present non-limiting example, said product is an aerated beverage), is supplied to the apparatus by means of a pump 10 for feeding a bottle-filling machine, which pump supplies said feedstock according to a flow rate and a pressure as required by the type of racking device involved and by the liquids packaged. The existing pump for feeding the bottle-filling machine is generally used.

According to the present invention, a dynamic saturation/blending loop, having a small volume, is incorporated in a feed line feeding the bottle-filling machine, between said pump 10 and the bottle-filling machine, said loop being designated in FIG. 1 of the attached drawings by reference number 14.

In the present exemplified embodiment, which relates, as mentioned above, to the production of aerated beverages, said loop 14 essentially comprises:

a static or dynamic mixer 16 for receiving, upstream, on the one hand, the driving product which is supplied by the pump 10 feeding the bottle-filling machine and, on the other hand, the driven products which are supplied, respectively, via feed lines, such as a feed line 18 shown in FIG. 1 and described in more detail hereinafter. Said mixer 16 feeds a pump 20 (referred to hereinafter as the "pump of the dynamic loop") which ensures a minimum flow rate which exceeds the flow rate of the bottle-filling machine, so as to provide a continuous circulation in the dynamic loop 14; it will be noted that, according to the invention, it is possible for the mixer 16 to be formed by the centrifugal pump 10, as such, having one or multiple stages, with the mixer 16, preferably a dynamic mixer, being provided for mixtures of liquid and highly viscous products;

a storing loop 9 which has a capacity which is adapted to the flow rate of and to the product prepared;

a manual or automatic drain cock 22, disposed in an upper region of the storage loop 9 of the dynamic loop 14;

a static mixer 24 for ensuring the final homogeneity of the product, as will be explained hereinafter;

control valves 26 and 26' for pressure losses, provided at an outlet of the dynamic loop 14 in order to adjust the pressure in the storing loop 9 of the dynamic loop 14 and in the saturator 11, as described hereinafter, and in the direction of the bottle-filling machine;

a separator 27 for ensuring the discharge of a clear liquid mixture in the direction of a line 12 feeding the bottle-filling machine;

a feed line 15 feeding compressed gas ($CO_2$) for producing the aerated beverage, said feed line comprising a pressure-reducing valve 31, a flow meter 32, control valves 33 and an automatic all-or-nothing valve 34, as well as a pressure-reducing valve 35 which ensures a constant pressure difference between the feeding pressure of the gas and the pressure in the saturator 11, with the latter being likely to vary;

a saturator, designated overall in FIG. 1 by the reference number 11, for introducing and dissolving a gas ($CO_2$) into the homogeneous mixture circulating in the loop 14, said saturator 11 comprising, as will be described below, a non-return valve to prevent liquid from flowing back into the feed line 15 for $CO_2$.

FIG. 2 of the attached drawings gives a detailed view of the saturator 11, in which a valve is incorporated in the liquid flow stream, for preventing liquid from flowing back into the gas supply pipe or feed line 15. Said saturator comprises a body 25 in which is disposed an upstream venturi tube 23 having an axial pipe 17 for the injection of gas ($CO_2$), which pipe 17 communicates with a diffusion neck 19 which is provided with radial nozzles and is fitted with a non-return ring 21 of a plastics material, in particular an elastomer material. It will be understood that, when compressed gas is injected, the ring 21 dilates, in a manner such that the nozzles provided in the diffusion neck 19 are cleared and, accordingly, it is possible for the gas to pass through and mix with the liquid circulating in the dynamic saturation/blending loop 14, and that, in the absence of compressed gas, the ring 21 lies flat against the diffusion neck 19, thereby sealing off the nozzles of said diffusion neck and preventing the liquid from flowing back through the pipe 17 for the injection of gas.

The mixture, comprising the driving product, the driven products and gas, in substantially constant proportions, is directed, according to the given flow rate, toward the bottle-filling machine via the dynamic loop 14, in which it circulates continuously and at a constant rate, even in the event of a stoppage in the flow to the bottle-filling machine. The function of the dynamic loop 14 is to ensure constant proportions and homogeneity of the mixture, despite minor variations owing to stoppages and re-starts of the flow stream resulting from stoppages of the bottle-filling machine.

In the present exemplified embodiment, the lines 18 supply the driven products which are to be mixed with the driving product in the dynamic loop 14, and said lines comprise, in particular, wide-range modulating valves 36, 36' for the flow rate, all-or-nothing valves (which close when the bottle-filling machine is stopped), flow meters such as 37, and pressure-reducing valves which ensure a constant pressure, downstream, on the modulating valves 36, 36'.

The apparatus is completed by pressure gauges or pressure sensors 13, 28, 29 which are provided at various points of the dynamic loop 14, a flow meter 30 and in-line metering loops, said meterings being taken at the outlet from the dynamic loop in the line 12 feeding the bottle-filling machine (finished product), for the density or before saturation (loop product) for the $CO_2$. It is possible for said metering loops to be designed to be bypass or sidestream loops, when the sensors cannot be integrated in line. In that instance, a pressure-loss control valve is provided in the dynamic loop 14, between the inlet to and the outlet from the loop, by way of a branch, in order to permit the flow rate in said metering loops to be adjusted.

It is possible for the apparatus according to the invention to operate automatically and it is possible for the automation process to comprise the following steps:

a) a proportional control, on the basis of a proportion-calculating algorithm, between the flow rate of finished product (measured by the flow meter 30) used by the bottle-filling machine and the respective flow rates of the driven products (measured by the flow meters 37 and 32, with regard to the gas which is absorbable in a driven product), the automatic control producing set percentages or set points for the injection of driven products, as a factor depending on the finished product bottled. The meterings obtained from the above-mentioned metering loops (dissolved $CO_2$, etc.) are used as automatic-control/correction when the flow rate is stable. During phases in which the flow rate varies, the correction which is to be taken into consideration will be the last correction measured prior to the variation in the flow rate;

b) producing the parameters of the driven products, stored per product to be produced, in order to permit an automatic control of the plant depending on the product to be packaged or bottled;

c) control of the quantity of product to be prepared;

d) use of warning signals produced by the automatic control when variations in the finished product are detected, on the basis of predetermined high and low thresholds, accompanied by stoppage of the bottle-filling operation and automatic recycling, and e) stopping the circulation of liquids in the dynamic loop 14 (stopping the pump 20) in the event of an interruption in the bottle-filling operation or in the event of a warning signal, with the pump 20 of the dynamic loop 14 stopping after a time delay, so as to prevent the temperature from rising in the dynamic loop.

The advantages provided by the invention include, in particular, the following:

maintaining excellent homogeneity of the mixture, due to the presence of the dynamic loop 14 in which the mixture circulates continuously, even in the event of a stoppage of the bottle-filling machine;

a considerable reduction in the volume of the production apparatus, in view of the fact that the usual buffer flasks are omitted;

a small quantity of finished products held in the apparatus, in view of the small volume of the dynamic loop 14;

a considerable reduction in maintenance costs;

achieving a constant percentage saturation, whatever the variations in the flow rate, and the possibility of an in-line cleaning of the apparatus, which saves time and ensures a higher degree of hygiene.

It is, of course, understood that the present invention is not limited to the exemplified embodiments described and/or illustrated, but that it encompasses all variations which fall within the framework of the attached claims.

What is claimed is:

1. A container feeding apparatus for preparing homogenous mixtures from liquid components having different viscosities, comprising:

a variable flow rate pump for supplying a driving liquid component;

means for supplying a driven liquid component;

a loop line in which the mixture circulates continuously with constant speed and including a) a first inlet for receiving the supplied driving liquid component;

b) gas diluting means connected at its first inlet to a source of compressed gas for supplying diluted gas to a second inlet of the loop line in a single direction;

c) the means for supplying the driven liquid component being connected to a third inlet of the loop line and to an outlet of the diluting means;

d) a mixer connected at its inlet to the outlet of the diluting means and to the third inlet of the loop line for mixing the driven and driving liquid components with the diluted compressed gas;

an outlet of the loop line providing the homogenous mixture to a container feed line; and pump means located upstream of an outlet of the mixer for unidirectionally circulating the mixture in the loop line with a minimum slow rate that exceeds the flow rate in the container feed line.

2. The container feeding apparatus of claim 1, wherein the source of compressed gas comprises:

a series connection of a first pressure reducing valve, a flow meter, a plurality of control valves and a second pressure reducing valve.

3. The container feeding apparatus of claim 1 further comprising a static mixer located between the pump means and the loop line outlet for dispersing gas present in the homogenous mixture.

4. The container feeding apparatus of claim 1 further comprising pressure sensors and in line metering means located in the container feed line and the source of compressed gas for metering the density of the mixture at the loop line outlet.

5. The container feeding apparatus of claim 1 further comprising pressure loss control valves respectively connected to the container feed line and the means for supplying a driving liquid component.

6. The container feeding apparatus of claim 1 further comprising, in the means for supplying the driven liquid component, wide range modulation valves, flow meters and pressure reducing valves for ensuring a constant pressure on the modulating valves.

7. The container feeding apparatus of claim 1 wherein the gas diluting means comprises a saturator and a check valve for ensuring single direction flow of diluted gas.

8. The container feeding apparatus of claim 7 wherein the saturator further comprises:

a body in which a venturi tube is disposed, the tube having an injection pipe for injecting gas, a diffusion neck in which radial nozzles are located, the neck being fitted with a non-return ring of elastomeric material;

the injection pipe having an outlet that is connected to the diffusion neck.

\* \* \* \* \*